(12) United States Patent
Yan (10) Patent No.: US 12,170,658 B2
(45) Date of Patent: Dec. 17, 2024

(54) NETWORKING METHOD FOR HOUSEHOLD APPLIANCE, HOUSEHOLD APPLIANCE, AND TERMINAL DEVICE

(71) Applicants: GD MIDEA AIR-CONDITIONING EQUIPMENT CO., LTD., Guangdong (CN); MIDEA GROUP CO., LTD., Guangdong (CN)

(72) Inventor: Lin Yan, Guangdong (CN)

(73) Assignees: GD MIDEA AIR-CONDITIONING EQUIPMENT CO., LTD., Guangdong (CN); MIDEA GROUP CO., LTD., Guangdong (CN)

( * ) Notice: Subject to any disclaimer, the term of this patent is extended or adjusted under 35 U.S.C. 154(b) by 295 days.

(21) Appl. No.: 17/703,299

(22) Filed: Mar. 24, 2022

(65) Prior Publication Data

US 2022/0217131 A1    Jul. 7, 2022

Related U.S. Application Data

(63) Continuation of application No. PCT/CN2020/088824, filed on May 6, 2020.

(30) Foreign Application Priority Data

Oct. 29, 2019   (CN) .......................... 201911036768.3

(51) Int. Cl.
*H04L 9/40*    (2022.01)
(52) U.S. Cl.
CPC .................................. *H04L 63/083* (2013.01)
(58) Field of Classification Search
CPC ............ H04L 63/083; H04W 12/0471; H04W 12/50; H04W 84/12; H04W 48/14; H04W 12/06; H04W 48/16

USPC ............................................................ 726/5
See application file for complete search history.

(56) References Cited

U.S. PATENT DOCUMENTS

2017/0195318 A1* 7/2017 Liu ....................... H04L 67/562
2018/0176771 A1   6/2018 Yang et al.

FOREIGN PATENT DOCUMENTS

| CN | 105357737 A | 2/2016 |
| CN | 105491568 A | 4/2016 |
| CN | 105491600 A | 4/2016 |
| CN | 106209537 A | 12/2016 |

(Continued)

OTHER PUBLICATIONS

Notice of Reasons for Refusal dated May 23, 2023 received in Japanese Patent Application No. JP 2022-515596.

(Continued)

*Primary Examiner* — Jeffrey C Pwu
*Assistant Examiner* — Nega Woldemariam
(74) *Attorney, Agent, or Firm* — Scully, Scott, Murphy & Presser, P.C.

(57) ABSTRACT

A networking method for a household appliance, a household appliance, and a terminal device are provided. The household appliance is provided with a network module. According to the method, the network module receives router information and the account and the password of a router transmitted by a mobile terminal. The router information contains time-related data required for logging into the router; according to the router information and the account and the password of the router, log into the router.

9 Claims, 4 Drawing Sheets

```
receiving, by the network module, router information and an account and a     S101
password of a router transmitted by a mobile terminal, the router
information comprising time-related data required by accessing the router

↓ accessing the router according to the router information and the account     S102
                    and the password of the router
```

(56) References Cited

FOREIGN PATENT DOCUMENTS

| | | |
|---|---|---|
| CN | 106572148 A | 4/2017 |
| CN | 107222908 A | 9/2017 |
| CN | 108011726 A | 5/2018 |
| CN | 109451502 A | 3/2019 |
| JP | 2008004975 A | 1/2008 |
| JP | 2014060623 A | 4/2014 |
| JP | 2014135554 A | 7/2014 |
| WO | 2018064848 A1 | 4/2018 |

OTHER PUBLICATIONS

Notice of Reasons for Refusal dated Jan. 31, 2023 received in Japanese Patent Application No. JP 2022-515596.
Extended European Search Report dated Sep. 28, 2022 received in European Patent Application No. EP 20881804.7.
International Search Report dated Jul. 28, 2020 issued in PCT/CN2020/088824.
First OA of CN201911036768.3, dated Sep. 1, 2021.
Second OA of CN201911036768.3, dated Feb. 9, 2022.

\* cited by examiner

NETWORKING METHOD FOR HOUSEHOLD APPLIANCE, HOUSEHOLD APPLIANCE, AND TERMINAL DEVICE

CROSS-REFERENCE TO RELATED APPLICATIONS

This application is a continuation application of PCT International Application No. PCT/CN2020/088824, filed on May 6, 2020, which claims priority to and the benefit of the Chinese Patent Application No. 201911036768.3 filed on Oct. 29, 2019, the entire contents of which are incorporated herein by reference for all purposes. No new matter has been introduced.

FIELD

The present disclosure relates to the field of household electrical appliances, and in particular, to a networking method for a household appliance, a household appliance and a terminal device.

BACKGROUND

At present, more household appliances are provided with a networking function, for example, a WiFi function. In the environment of household WiFi network, it is required to set network up for the household appliance before allowing the household appliance to access the network, that is, to set a WiFi account and its password of a router for the household appliance.

There are technical disadvantages existing as below:

long time required for network setup, long waiting time for the household appliance to establish a connection to the router, low efficiency of network setup, and user complaint caused accordingly.

SUMMARY

The present disclosure aims to solve at least one of the above technical problems.

For this, one objective of the present disclosure is to provide a networking method for a household appliance. The method, when setting network up for the household appliance, is capable of reducing time consumed for a network module to connect a router, by means of router information transmitted by a mobile terminal, thereby accelerating network setup for the household appliance.

A second objective of the present disclosure is to provide a networking method for a household appliance.

A third objective of the present disclosure is to provide a household appliance.

A fourth objective of the present disclosure is to provide a mobile terminal.

A fifth objective of the present disclosure is to provide a computer-readable storage medium.

In order to achieve the above objectives, in a first aspect, the present disclosure provides, in certain embodiments thereof, a networking method for a household appliance. The household appliance is provided with a network module that can be implemented by a hardware processor. The method includes receiving, by the network module, router information and an account and a password of a router transmitted by a mobile terminal, the router information including time-related data required by accessing the router. The method further includes accessing the router according to the router information and the account and the password of the router.

According to certain embodiments of the present disclosure, the networking method for a household appliance, when setting the network for the household appliance, by means of the router information transmitted by the mobile terminal, is capable of reducing the time consumed by the network module connecting the router and accessing the internet, thereby accelerating the network setup for the household appliance.

In some examples, the networking method for the household appliance further includes: receiving, by the network module, a random number transmitted by the mobile terminal, and transmitting the random number to a server via the router after accessing the router; and broadcasting a random number to the mobile terminal, so that the mobile terminal determines whether network is set up successfully for the network module according to the random number broadcasted by the network module and a random number sent back from the server.

In some examples, the time-related data required by accessing the router includes some or all of router bandwidth, router channel, and router encryption.

In some examples, the time-related data required by accessing the router includes connection handshake protocol data connected to the router.

In a second aspect, the present disclosure provides, in certain embodiments thereof, a networking method for a household appliance. The household appliance is provided with a network module. The method includes acquiring, by a mobile terminal, router information. The method further includes transmitting the router information and an account and a password of a router to the network module, so that the network module accesses the router according to the router information and the account and the password of the router, wherein the router information includes time-related data required by accessing the router.

According to certain embodiments of the present disclosure, the networking method for a household appliance, when setting the network for the household appliance, by means of the router information transmitted by the mobile terminal, is capable of reducing the time consumed by the network module connecting the router and accessing the internet, thereby accelerating the network setup for the household appliance.

In some examples, the networking method for a household appliance further includes: transmitting, by the mobile terminal, a random number to the network module; and determining whether network is set up successfully for the network module according to a random number broadcasted by the network module and a random number sent back from a server.

In a third aspect, the present disclosure provides, in certain embodiments thereof, a household appliance. The household appliance is provided with a network module that can be implemented by a hardware processor. The network module is configured to receive router information and an account and a password of a router transmitted by a mobile terminal; and access the router according to the router information and the account and the password of the router, wherein the router information includes time-related data required by accessing the router.

According to certain embodiments of the present disclosure, the household appliance, when being set up with the network, by means of the router information transmitted by the mobile terminal, is capable of reducing the time consumed by the network module connecting the router and accessing the internet, thereby accelerating the network setup for the household appliance.

In some examples, the network module is further configured to receive a random number transmitted by a mobile terminal; transmit the random number to a server via the router after accessing the router; and broadcast a random number to the mobile terminal, so that the mobile terminal determines whether network is set up successfully for the network module according to the random number broadcasted by the network module and a random number sent back from the server.

In a fourth aspect, the present disclosure provides, in certain embodiments thereof, a mobile terminal. The mobile terminal is configured to acquire router information. The mobile terminal is further configured to transmit the router information and an account and a password of a router to a network module of a household appliance, so that the network module accesses the router according to the router information and the account and the password of the router, wherein the router information includes time-related data required by accessing the router.

According to certain embodiments of the present disclosure, the mobile terminal, when setting the network for the household appliance, by means of the router information transmitted to the network module, is capable of reducing the time consumed by the network module connecting the router and accessing the internet, thereby accelerating the network setup for the household appliance.

In a fifth aspect, the present disclosure provides, in certain embodiments thereof, a computer-readable storage medium having stored thereon a networking program of a household appliance that, when executed by a hardware processor, implements a networking method for a household appliance as described in the above first aspect.

In a sixth aspect, the present disclosure provides, in certain embodiments thereof, a computer-readable storage medium having stored thereon a networking program of a household appliance that, when executed by a hardware processor, implements a networking method for a household appliance as described in the above second aspect.

Additional aspects and advantages of the present disclosure will be given and become apparent in the description below, or learned by practice of the present disclosure.

BRIEF DESCRIPTION OF THE DRAWINGS

The above and/or additional aspects and advantages of the present disclosure will become obvious and understandable with the following description for certain embodiments by combining the accompanying drawings.

DETAILED DESCRIPTION OF EMBODIMENTS

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

A networking method for a household appliance, a household appliance and a terminal device are described below in conjunction with drawings in embodiments of the present disclosure.

The household appliance is provided with a network module, for example a Wireless Fidelity (WiFi) module. For example, the network module can be implemented by a hardware processor.

Figure 1:
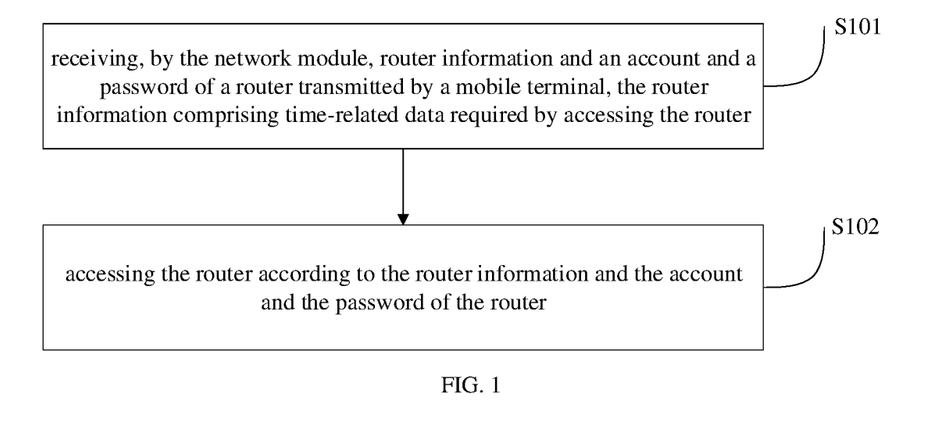
FIG. 1 is a flow chart showing a networking method for a household appliance in an embodiment of the present disclosure.

FIG. 1 is a flow chart showing a networking method for a household appliance in an embodiment of the present disclosure. As shown in FIG. 1, and in conjunction with FIG. 2, according to an embodiment of the present disclosure, the networking method for a household appliance includes the following steps S101 and S102.

At the step S101, router information and an account and a password of a router transmitted by a mobile terminal are acquired by the network module. The router information includes time-related data required by accessing the router. The time-related data required by accessing the router includes but not limited to routing channel data, PTK, MTK handshake data, etc.

For example, the mobile terminal accesses the router and establishes connection to the network mobile, allowing the household appliance to enter a network setup mode, such that the mobile terminal transmits the router information and the account and the password of the router to the network module by a corresponding application.

In an exemplary embodiment, the mobile terminal accesses the router and acquires the router information. The router information includes time-related data required by accessing the router. For example, the time-related data required by accessing the router includes some or all of router bandwidth, router channel, and router encryption. Further, the time-related data required by accessing the router may also include connection handshake protocol data connected to the router. For example, the router bandwidth, router channel, and router encryption are received so that time consumed by router channel scanning, bandwidth adaptation and encryption adaptation is effectively reduced when the network module connects the router; and the connection handshake protocol data connected to the router is received so that time consumed by connection handshake for accessing the router is effectively reduced.

In an exemplary embodiment, a process for acquiring the connection handshake protocol data connected to the router includes four-way handshakes.

A first handshake: the mobile terminal transmits an authentication request to a WiFi access point (i.e., AP) of the router, with the contents for example including: a frame control header, which records an original address, a destination address and other information; a management frame; steps for shared four-way handshakes, and a status code.

A second handshake: in response to receiving the request, the AP transmits an authentication response frame, which includes a random number sequence of 128 bytes.

A third handshake: in response to receiving the response frame from the AP, the mobile terminal generates an encrypted stream by Rivest Cipher 4 (i.e., RC4, an encryption algorithm) with an initialization vector (i.e., IV) where its own key is added with 3 bytes; encrypts the random number sequence of 128 bytes by XOR operation; and transmits to the AP.

A fourth handshake: the AP generates an encrypted stream by the RC4 algorithm with its own key added with IV transmitted by the mobile terminal; encrypts the random number sequence by XOR operation. Based on that the key of the mobile terminal is same as the key of the AP, two encrypted sequences are same. Accordingly, the connection handshake protocol data connected to the router is obtained, which is also referred to as the four-way handshake data.

At the step S102, the router is accessed according to the router information and the account and the password of the router.

In an exemplary embodiment, the network module further receives a random number transmitted by the mobile terminal; transmits the random number to a server via the router after accessing the router; and broadcasts a random number to the mobile terminal, so that the mobile terminal determines whether the network is set up successfully for the network module according to the random number broadcasted by the network module and a random number sent back from the server.

Figure 2:
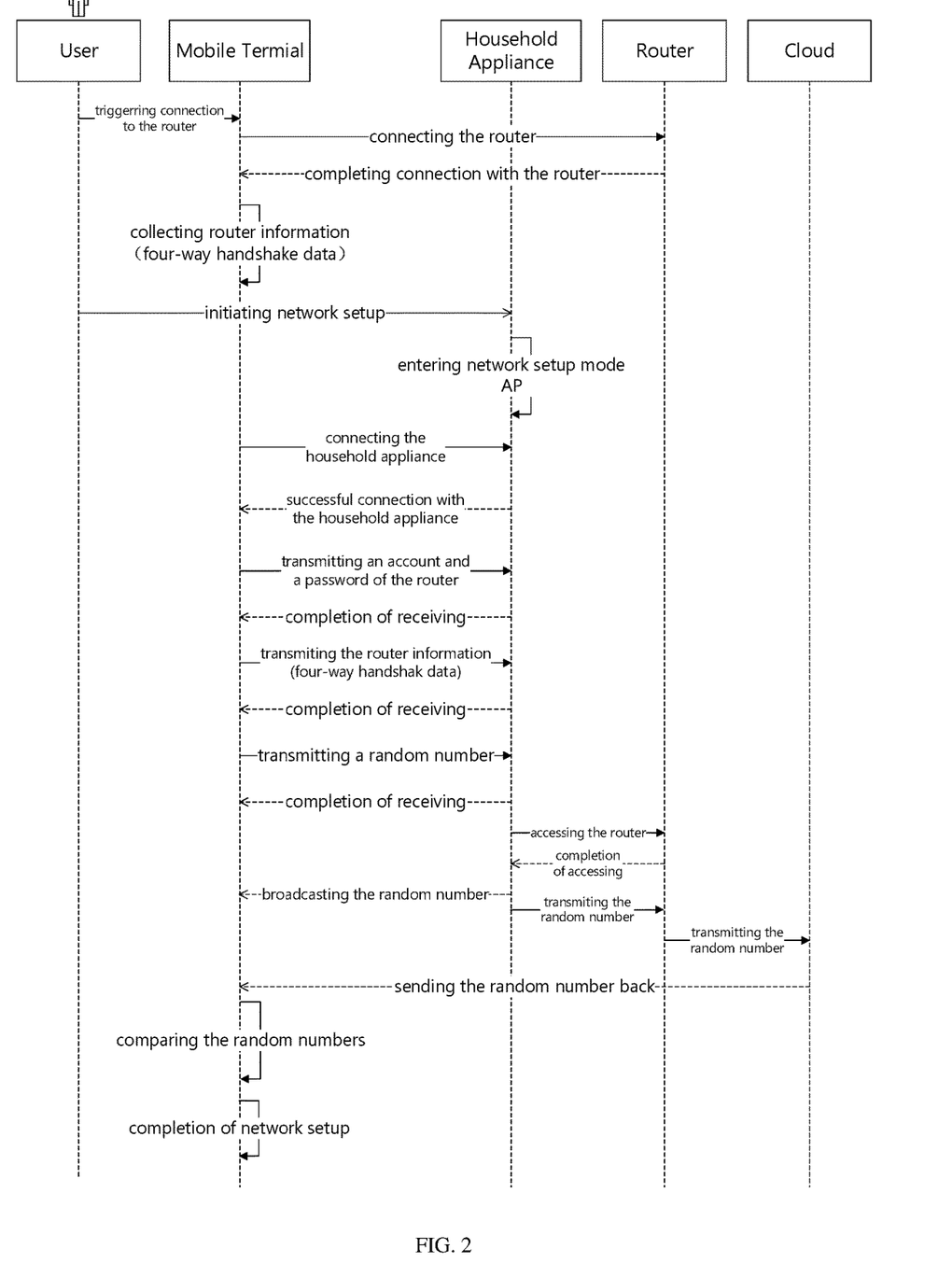
FIG. 2 is a detailed flow chart showing a networking method for a household appliance in an embodiment of the present disclosure.
Figure 3:
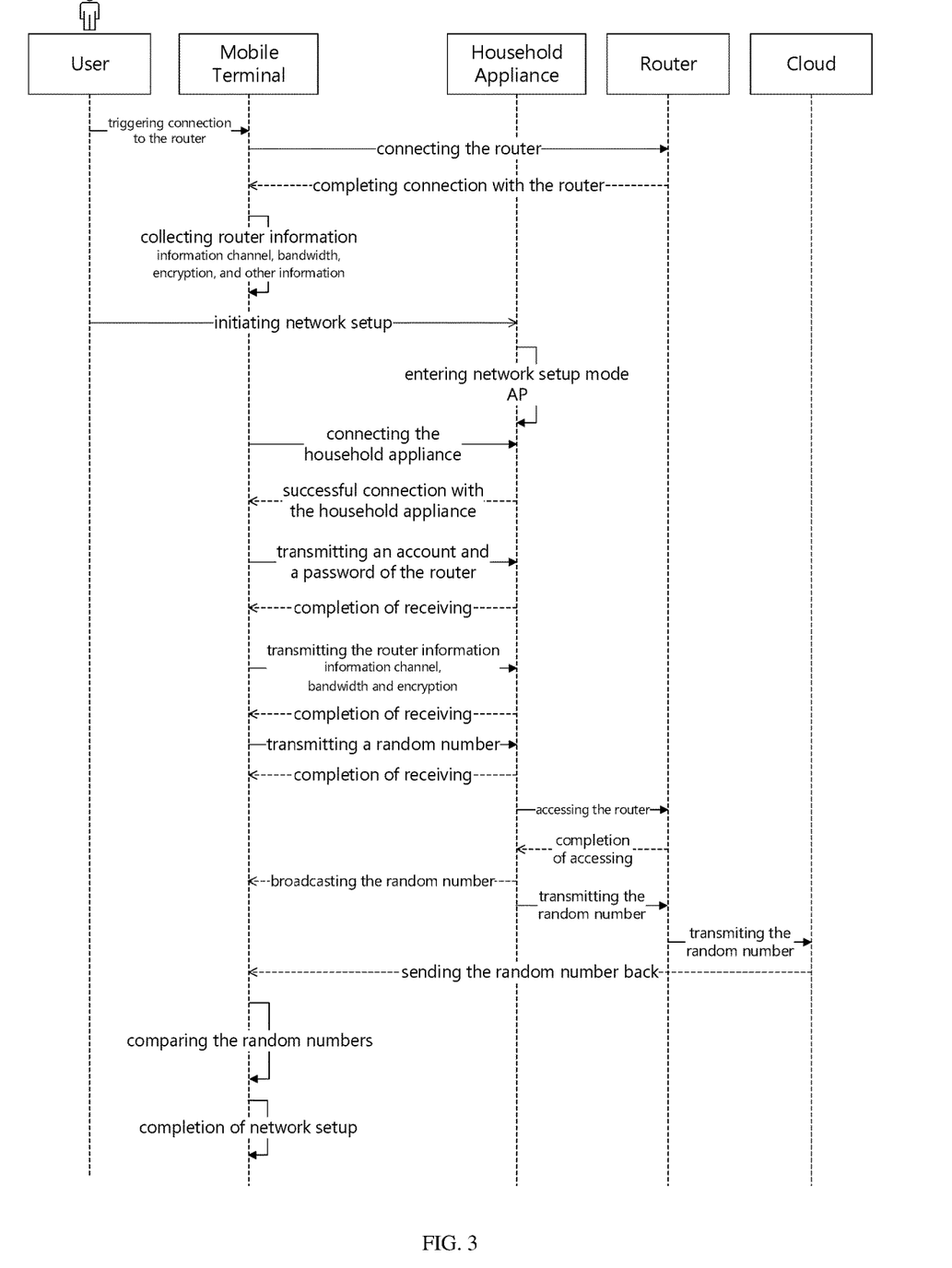
FIG. 3 is a detailed flow chart showing a networking method for a household appliance in another embodiment of the present disclosure.

In conjunction with FIGS. 2 and 3, the household appliance is allowed to enter the network setup mode in response to that the household appliance is operated on its panel or via a remoter by a user. In the process of entering the network setup, the mobile terminal transmits the random number to the household appliance; the household appliance stores the random number transmitted. The mobile terminal is connected to the router to collect the router information, and transmits the WiFi account and its password (i.e., the account and the password of the router) required by the network setup. The household appliance accesses the router according to the router information and the account and the password of the router. The mobile terminal compares a random number sent back from the server and a random number broadcasted by the household appliance, and determines that the network setup is completed for the household appliance based on consistent comparison. That is, the household appliance has been connected to the router correctly, allowing access of the internet.

For example, the network module receives the router bandwidth, router channel, and router encryption, thereby effectively reducing time consumed by router channel scanning, bandwidth adaptation and encryption adaptation when the network module connects the router; the network module receives the connection handshake protocol data connected to the router, thereby effectively reducing time consumed by the connection handshake for accessing the router.

According to certain embodiments of the present disclosure, the networking method for a household appliance, when setting the network for the household appliance, by means of the router information transmitted by the mobile terminal, is capable of reducing the time consumed by the network module connecting the router and accessing the internet, thereby accelerating the network setup for the household appliance.

Figure 4:
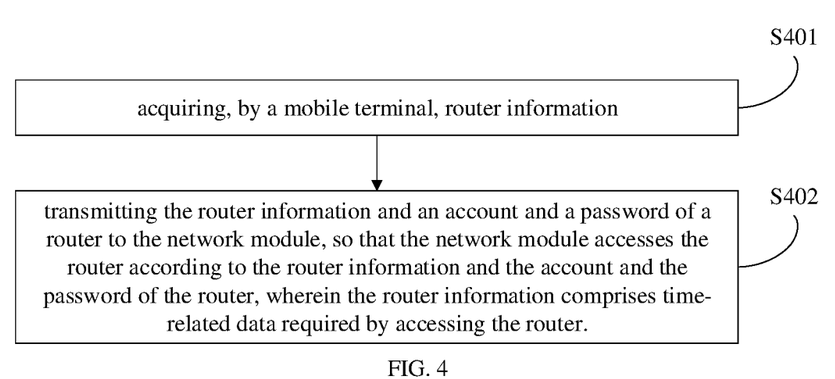
FIG. 4 is a flow chart showing a networking method for a household appliance in another embodiment of the present disclosure.

FIG. 4 is a flow chart showing a networking method for a household appliance in an embodiment of the present disclosure, including steps S401 and S402.

At the step S401, router information is acquired by a mobile terminal.

At the step S402, the router information and an account and a password of a router are transmitted to a network module, so that the network module accesses the router according to the router information and the account and the password of the router. The router information includes time-related data required by accessing the router.

In an embodiment of the present disclosure, the method further includes: transmitting, by the mobile terminal, a random number to the network module; determining whether the network is set up successfully for the network module according to a random number broadcasted by the network module and a random number sent back from the server.

According to certain embodiments of the present disclosure, the networking method for a household appliance, when setting the network for the household appliance, by means of the router information transmitted by the mobile terminal, is capable of reducing the time consumed by the network module connecting the router and accessing the internet, thereby accelerating the network setup for the household appliance.

Further, the present disclosure provides in certain embodiments a household appliance. The household appliance is provided with a network module, and the network module is configured to receive router information and an account and a password of a router transmitted by the mobile terminal, and access the router according to the router information and the account and the password of the router. The router information includes time-related data required by accessing the router.

In an embodiment of the present disclosure, the network module is further configured to receive a random number transmitted by the mobile terminal; transmit the random number to a server via the router after accessing the router; broadcast a random number to the mobile terminal, so that the mobile terminal determines whether the network is set up successfully for the network module according to the random number broadcasted by the network module and a random number sent back from the server.

According to certain embodiments of the present disclosure, the household appliance, when being set up with the network, by means of the router information transmitted by the mobile terminal, is capable of reducing the time consumed by the network module connecting the router and accessing the internet, thereby accelerating the network setup for the household appliance.

Further, the present disclosure provides, in certain embodiments thereof, a mobile terminal configured to acquire router information and transmit the router information and an account and a password of a router to a network module of a household appliance, so that the network module accesses the router according to the router information and the account and the password of the router. The router information includes time-related data required by accessing the router.

According to certain embodiments of the present disclosure, the mobile terminal, when setting the network for the household appliance, by means of the router information transmitted to the network module, is capable of reducing the time consumed by the network module connecting the router and accessing the internet, thereby accelerating the network setup for the household appliance.

The present disclosure provides, in certain embodiments thereof, a computer-readable storage medium having stored thereon a networking program of a household appliance that, when executed by a hardware processor, implements the networking method for a household appliance in any of the above embodiments of the present disclosure.

The above computer-readable storage medium may be any combination of one or more computer-readable medium. The computer-readable medium may be a computer-readable signal medium or a computer-readable storage medium. The computer-readable storage medium can be, for example, but not limited to, an electrical, magnetic, optical, electromagnetic, infrared, or semiconductor system, apparatus or device, or a combination of any of the above. More specific examples (non-exhaustive list) of the computer-readable storage medium include: electrical connection with one or more wires, portable computer disk, hard disk, random access memory (RAM), read only memory (hereinafter referred to as: ROM), erasable programmable read only memory (hereinafter referred to as: EPROM) or flash memory, optical fiber, portable compact disk read only memory (CD-ROM), optical storage device, magnetic storage device, or any suitable combination of the above. Herein, a computer-readable storage medium may be any tangible medium that includes or stores a program that can be applied to or in combination with an instruction execution system, apparatus or device.

A computer-readable signal medium may include a propagated data signal in baseband or as part of a carrier wave, with computer-readable program code embodied thereon. Such propagated data signals may take a variety of forms including, but not limited to, an electromagnetic signal, an optical signal, or any suitable combination of the foregoing. A computer-readable signal medium may also be any computer-readable medium, other than a computer-readable storage medium, that can transmit, propagate, or transport a program that can be applied to or in connection with an instruction execution system, apparatus or device. Program code embodied on a computer readable medium may be transmitted by any suitable medium including, but not limited to, wireless, wireline, optical fiber cable, RF, etc., or any suitable combination of the foregoing. Computer program code for carrying out the operations of the present disclosure may be written in one or more programming languages, including object-oriented programming languages—such as Java, Smalltalk, C++, but also conventional Procedural programming language—such as the "C" language or similar programming language. The program code may be executed entirely on a user's computer, partly on a user's computer, as a stand-alone software package, partly on a user's computer and partly on a remote computer, or entirely on a remote computer or a server. In the case of a remote computer, the remote computer may be connected to the user's computer through any kind of networks, including a Local Area Network (LAN) or a Wide Area Network (WAN), or connected to an external computer (e.g., connection via the Internet by an Internet Service Provider). Although the embodiments of the present disclosure have been shown and described, it will be understood by those of ordinary skill in the art that various changes, modifications, substitutions and alterations can be made in these embodiments without departing from the principles and spirit of the present disclosure. The scope of the present disclosure is defined by the claims and their equivalents.

What is claimed is:

1. A networking method for a household appliance, wherein the household appliance is provided with a hardware processor for implementing a network module, the networking method comprising:
   receiving, by the hardware processor, router information and an account and a password of a router transmitted by a mobile terminal, the router information comprising time-related data required to access the router;
   accessing, by the hardware processor, the router according to the router information and the account and the password of the router; and
   after accessing the router:
      receiving, by the hardware processor, a random number transmitted by the mobile terminal;
      transmitting, by the hardware processor, the random number received from the mobile terminal to a server via the router so that the server sends back the random number transmitted from the household appliance to the mobile terminal; and
      broadcasting, by the hardware processor, the random number to the mobile terminal, so that the mobile terminal compares the random number transmitted from the server with the random number broadcasted from the household appliance to confirm a network setup between the household appliance and the router is completed based on a result of the comparison being a consistent comparison.

2. The networking method for a household appliance according to claim 1, wherein the time-related data required by accessing the router comprises some or all of router bandwidth, router channel, and router encryption.

3. The networking method for a household appliance according to claim 1, wherein the time-related data required by accessing the router comprises connection handshake protocol data connected to the router.

4. The networking method for a household appliance according to claim 2, wherein the time-related data required by accessing the router comprises connection handshake protocol data connected to the router.

5. A non-transitory computer-readable storage medium having stored thereon a networking program of a household appliance that, when executed by a hardware processor, implements the networking method according to claim 1.

6. A networking method for a household appliance, wherein the household appliance is provided with a hardware processor for implementing a network module, the networking method comprises:
   acquiring, by a mobile terminal, router information;
   transmitting, by the mobile terminal, the router information and an account and a password of a router to the hardware processor, so that the hardware processor accesses the router according to the router information and the account and the password of the router, wherein the router information comprises time-related data required to access the router; and
   after the household appliance accesses the router:
      transmitting, by the mobile terminal, a random number to the hardware processor;
      receiving, by the mobile terminal, the random number from a server, wherein the server received the random number transmitted from the mobile terminal via the router;
      receiving, by the mobile terminal, the random number broadcasted by the household appliance;
      comparing, by the mobile terminal, the random number received from the server with the random number received from the household appliance; and
      confirming, by the mobile terminal, a network setup between the household appliance and the router is completed based on a result of the comparison being a consistent comparison.

7. A mobile terminal comprising a hardware processor, wherein the hardware processor is configured to implement the networking method according to claim 6.

8. A non-transitory computer-readable storage medium having stored thereon a networking program of a household appliance that, when executed by a processor, implements the networking method according to claim 6.

9. A household appliance comprising a hardware processor for implementing a network module,
wherein the hardware processor is configured to;
receive router information and an account and a password of a router transmitted by a mobile terminal, the router information comprising time-related data required to access the router;
access the router according to the router information and the account and the password of the router; and
after accessing the router:
receive a random number transmitted by the mobile terminal;
transmit the random number received from the mobile terminal to a server via the router so that the server sends back the random number transmitted from the household appliance to the mobile terminal; and
broadcast the random number to the mobile terminal, so that the mobile terminal compares the random number transmitted from the server with the random number broadcasted from the household appliance to confirm a network setup between the household appliance and the router is completed based on a result of the comparison being a consistent comparison.

\* \* \* \* \*